United States Patent [19]

Lauer et al.

[11] Patent Number: 5,732,087
[45] Date of Patent: Mar. 24, 1998

[54] ATM LOCAL AREA NETWORK SWITCH WITH DUAL QUEUES

[75] Inventors: Hugh C. Lauer, Concord, Mass.; Abhijit Ghosh, Berkeley, Calif.; John H. Howard, Cambridge, Mass.; Harufusa Kondoh, Ikeda, Japan; Randy B. Osborne, Newton, Mass.; Chia Shen, Watertown, Mass.; Qin Zheng, Boxboro, Mass.

[73] Assignee: Mitsubishi Electric Information Technology Center America, Inc., Cambridge, Mass.

[21] Appl. No.: 644,424

[22] Filed: May 10, 1996

[51] Int. Cl.$^6$ ................................ H04L 12/56
[52] U.S. Cl. ................. 370/416; 370/417; 370/418
[58] Field of Search ........................ 370/412, 413, 370/414, 415, 416, 417, 418

[56] References Cited

U.S. PATENT DOCUMENTS

| | | | |
|---|---|---|---|
| 4,603,416 | 7/1986 | Servel et al. | 370/417 |
| 4,939,720 | 7/1990 | Bakka | 370/417 |
| 5,166,930 | 11/1992 | Braff et al. | 370/235 |
| 5,233,603 | 8/1993 | Takeuchi et al. | 370/412 |
| 5,455,825 | 10/1995 | Lauer et al. | 370/413 |

*Primary Examiner*—Hassan Kizou

[57] ABSTRACT

A switch for digital communication networks includes a queuing system capable of implementing a broad class of scheduling algorithms for many different applications and purposes, with the queuing system including both a tag-based primary queue which contain ATM cells organized by priority and a secondary queue which contains ATM cells which are not yet scheduled for transmission and which are organized by virtual channel. A queuing decision module is provided to determine in which queue an incoming ATM cell should be deposited. A requeuing module operates when an event occurs that unblocks a particular virtual channel. The requeuing module, on occurrence of such an event, accesses the secondary queue to obtain another cell, to assign it priority and to move it to the primary queue. The queuing decision module, along with a virtual channel table, can be used easily to block virtual channels when necessary. The combination of queues also allows for round robin scheduling.

2 Claims, 6 Drawing Sheets

ATM LOCAL AREA NETWORK SWITCH WITH DUAL QUEUES

FIELD OF THE INVENTION

This invention relates to digital communication networks in which cells or packets traverse a network from node to node, and more particularly to a digital communication network switch having an improved system for scheduling the order that cells are transmitted from one node to another node in the network.

BACKGROUND OF THE INVENTION

In general, in a digital communication network, messages or streams of information are subdivided into sequences of small units called packets or cells. Such cells or packets are transmitted from node to node. In each node a switch, called a network switch, selects both the order of transmitting such cells or packets and the next node to which they are to be transmitted. Thus, in such networks the digital information reaches its ultimate destination in a timely manner. It is desirable that these network switches be capable of supporting network traffic of various characteristics including traffic requiring hard real-time guarantees of timely delivery, continuous media traffic for audio and video, and traffic requiring very rapid response.

One important kind of digital communications network is called an Asynchronous Transfer Mode (ATM) network. ATM networks provide for the transmission of data from one point or node in the network to one or more other points or nodes by the subdivision of the data or information into sequences of small cells of fixed size which are then transmitted through the network from node to node. Such nodes include ATM switches which provide fast packet or cell switching and routing between nodes of the network. General principles of ATM networks are described in articles by J. Bryan Lyles and Daniel C. Swinehart, "The Emerging Gigabit Environment and the Role of Local ATM," *IEEE Communications Magazine*, vol. 30, #4, April 1992, pp. 52–58, and by C. Lamb, "Speeding to the ATM," *Unix Review*, vol. 10, #10, October 1992, pp. 29–36.

One of the major problems with ATM networks is the problem of scheduling of cells to be transmitted by each switch. The cells are in general buffered at each switch in queues. Assuming no congestion, these cells are received from an incoming link at a switch and immediately transmitted over an outgoing link to another destination. However, when cells arrive over multiple input links and must be transmitted onto the same output link at the same time, it is necessary to form a queue of cells so that they can be transmitted in the desired order.

In order to accommodate the scheduling of which cells are to be transmitted at what time and in what order, it is common to utilize a first-in, first-out (FIFO) ordering system in which cells are transmitted according to their order of arrival at the switch. In the case of networks which support real time applications, cells are also typically assigned priorities and stored in separate queues by priority. Subsequently, cells are transmitted in an order dictated by the priorities of the separate queues. It will be appreciated that these simple systems can only support a limited number and class of real time applications, because the FIFO and priority scheduling mechanisms can only provide limited guarantees of timely transmission without loss of data.

For instance, first generation switches for ATM local and wide area networks provide very simple scheduling algorithms for scheduling and dispatching communication traffic from incoming to outgoing network links. Traffic is handled in FIFO order according to the ATM rules, but a small number of priority levels, usually two, are provided to support applications with real-time communication requirements in a very limited way. Unfortunately, a handful of statically assigned priorities is barely adequate for even moderate-sized local area networks with a lot of advanced, rapidly evolving applications. Furthermore, when applications need to transmit continuous media, such as audio and video, or when they need predictable response in real time, it is virtually impossible to make any kind of predictions or guarantees about the quality and timeliness of network service.

An advanced ATM network switch is described in U.S. Pat. No. 5,455,825. This ATM network switch includes a queue and buffer memory which is shared for all output lines of the switch. That is, input cells from all input ports are deposited directly into the common buffer memory. The common queuing and shared buffers improve statistical multiplexing, and provides both faster performance and lower cost. A reference to each cell in the shared buffer is placed in a shared queue. For each input cell, a numerical tag is determined and included in the queue. Cells are selected from the queue for transmission based on these tags using a queue and search module. Multiple classes of traffic including real-time traffic are supported in the switch, and each class can have its own scheduling algorithm and policy, such as simple-priority, FIFO or real-time. While such a switch has many advantages, it is difficult to control blocking of transmission on a virtual channel with this switch. Thus it may be difficult to implement round-robin or credit-based kinds of flow control.

SUMMARY OF THE INVENTION

The subject invention uses two queues to control flow for blocked and unblocked channels. In one embodiment, the system has a tag-based primary queue which contains ATM cells organized by priority and a secondary queue which contains ATM cells which are not yet scheduled for transmission, e.g., due to a channel being blocked, and which is organized by virtual channel. A queuing decision module is provided to determine in which queue an incoming ATM cell should be deposited. A requeueing module operates when an event occurs that unblocks a particular virtual channel. The requeuing module, on occurrence of such an event, accesses the secondary queue to obtain another cell, to assign it priority and to move it to the primary queue. The queuing decision module, along with a virtual channel table, can be used easily to block virtual channels when necessary. The combination of queues also allows for round robin scheduling.

BRIEF DESCRIPTION OF THE DRAWING

These and other features of the subject invention will be better understood in view of the following Detailed Description taken in conjunction with the Drawing of which.

DETAILED DESCRIPTION

Figure 1:
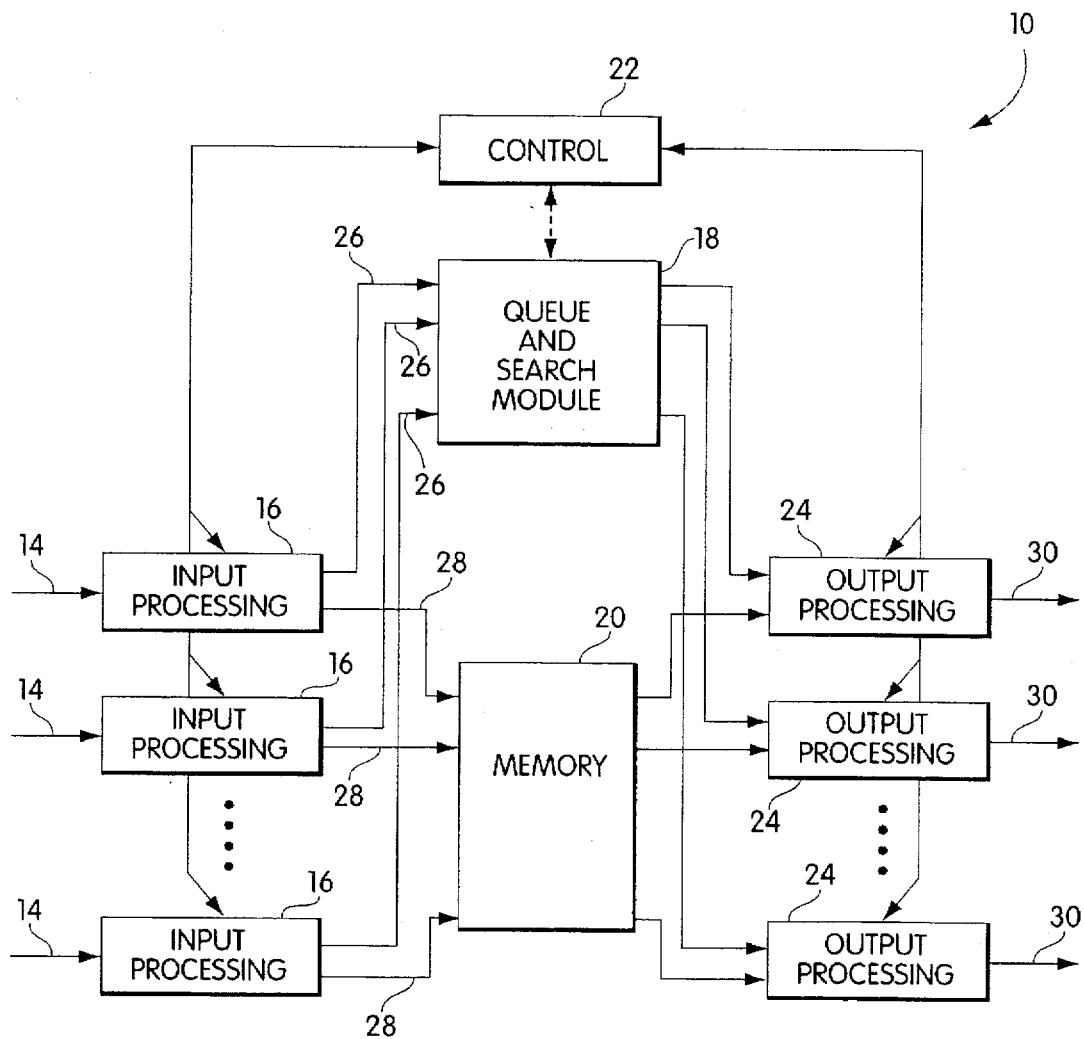
FIG. 1 is a block diagram illustrating a logical architecture of a known ATM switch showing a queue and search module under control of a control unit.

Referring now to FIG. 1, an ATM Switch 10 is provided. Such an ATM switch may be implemented as taught by U.S. Pat. No. 5,455,825, which is incorporated by reference herein. The ATM switch 10 has incoming lines 14, which are coupled to input processing modules 16, the outputs of which are respectively applied to a queue and search module 18 and a cell buffer memory 20. The queue and search module 18 is under control of a control unit 22, which, among other things, controls input processing modules 16, as well as output processing modules 24. Each input processing module 16 and output processing module 24 includes a microprocessor and memory or other means by which it can be configured or reconfigured by control unit 22 to perform any process appropriate to the requirements of the network for each cell arriving at or leaving the switch.

The outputs of queue and search module 18 are applied to respective output processing modules 24, as are the outputs of cell buffer memory 20. As illustrated at 26, the output of input processing module 16 contains destination information, tags and buffer addresses, which are coupled to queue and search module 18. Additionally, as illustrated at 28, cell headers and bodies are coupled to cell buffer memory 20.

In operation, a cell arrives at an input processing module 16 via an input link 14. Input processing module 16 performs cell-by-cell processing on the arriving cell. In addition to the normal housekeeping functions required in every ATM switch, input processing module 16 computes a tag value for each cell according to the scheduling algorithm for the virtual channel of the cell. The tag value is also based on the state of that channel and arrival time of the cell. A Virtual channel is an end-to-end connection of a particular stream of data, separate from all other streams of data. In an ATM network, a virtual channel is identified by a field of bits in the header of the cell. Input processing module 16 also computes and updates the status information of the virtual channel and other information maintained by the switch.

Following the calculation, the tag, the destination information and the buffer address of the cell are coupled to queue and search module 18, where they are stored in the queue. The cell header and cell data are coupled to cell buffer memory 20. At this point, the address, destination and tag of the cell are now in the queue, and its cell header and data are stored in the cell buffer memory. Input processing module 16 is then free to accept and begin processing the next cell. Therefore, the input processing must be completed within the time allotted to one cell cycle of the corresponding input link 14, that is the time required to receive an ATM cell at the bandwidth of the input link.

Under control of control unit 22, the queue and search module searches the queue in turn for a cell with destination bits corresponding to each output processing module 24. Output processing module 24 performs any remaining calculations required before the cell can be transmitted. It then transmits the cell over output link 30 to another node in the network or to its ultimate destination. The searching accomplished by the queue and search module 18 must be completed for all output processing units within the time allotted to one cell cycle of the fastest associated input link 14 and output link 30 of the switch. U.S. Pat. No. 5,455,825 describes the queue and search system in more detail.

Figure 2:
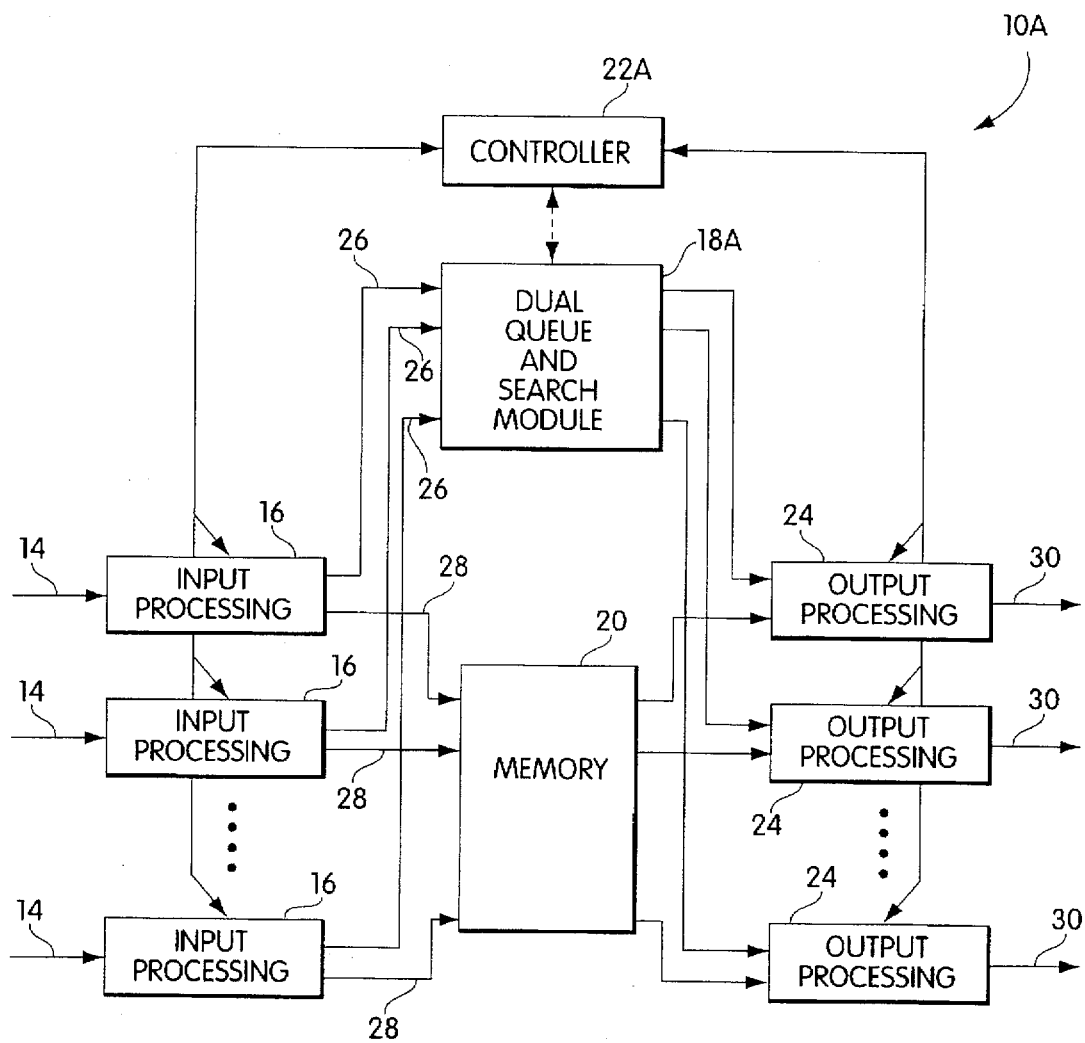
FIG. 2 is a block diagram of a switch in accordance with the invention.

Referring now to FIG. 2, the subject invention uses a dual queue architecture 18A in connection with a controller 22A. The remaining structure of the switch 10A is generally the same as switch 10 as shown in FIG. 1. More details of the dual queue architecture 18A and the controller 22A will now be described in connection with FIG. 3 and 4.

Figure 3:
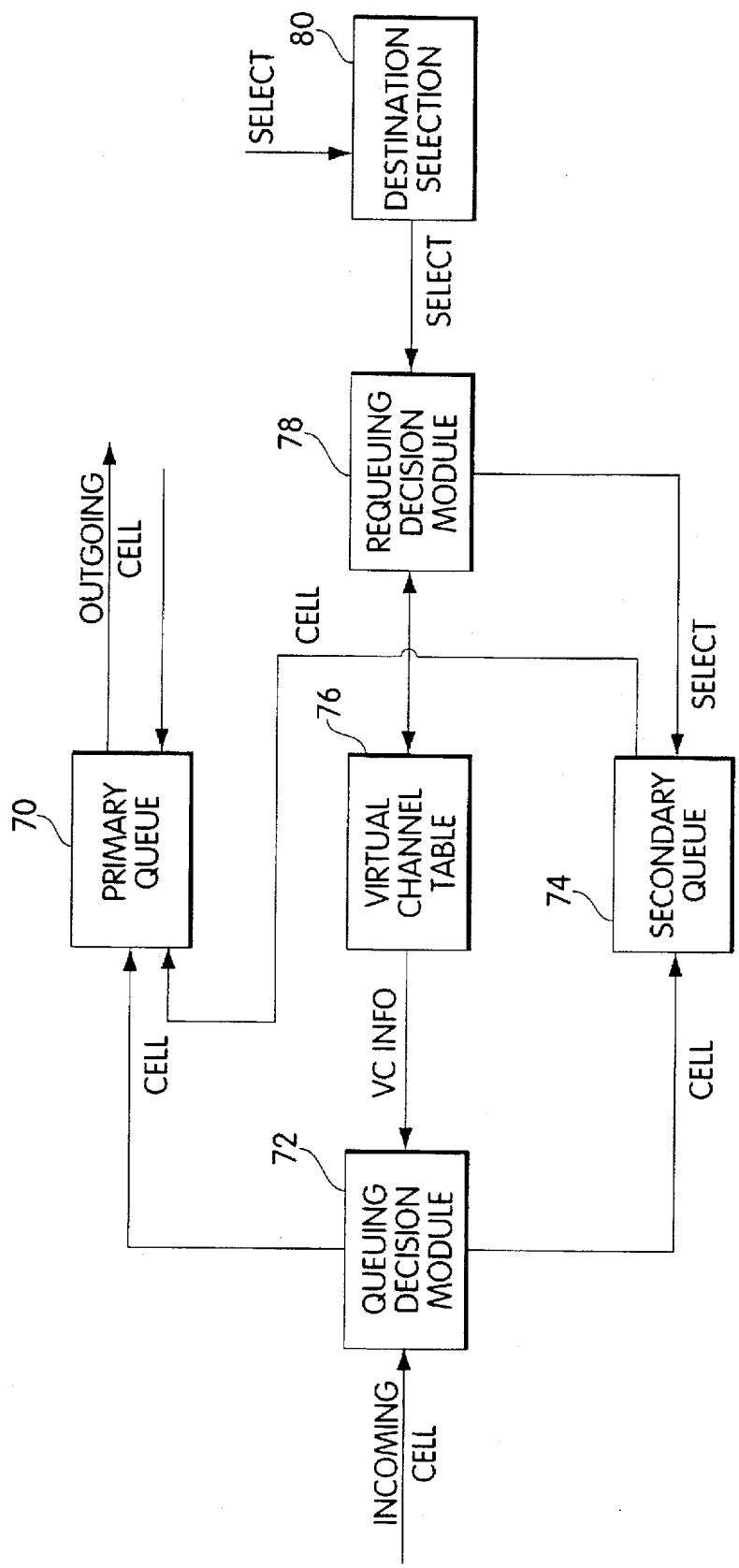
FIG. 3 is a block diagram showing the dual queue architecture of the present invention.

Referring now to FIG. 3, in the subject invention, a primary queue 70 is used for queuing cells to destinations corresponding to unblocked and active virtual channels. The primary queue 70 is implemented similar to the queue and search module 18 as shown in FIG. 1 and as described in U.S. Pat. No. 5,455,825. In addition to this primary queue 70, the subject invention uses a queuing decision module 72 which determines whether an incoming cell should be placed in a primary queue 70 or in a secondary queue 74. The queuing decision module uses a virtual channel table 76 to determine whether a virtual channel corresponding to the incoming cell is blocked or unblocked. Cells for blocked channels are directed to the secondary queue 74. Cells for unblocked channels are directed to the primary queue 70.

The secondary queue 74 may be implemented in a manner similar to a priority queue described in, for example, "An Efficient Self-Timed Queue Architecture for ATM Switch LSI's," by H. Kondoh et at., in *Custom Integrated Circuit Conference*, San Diego, May 1994 (Kondoh et al. 1994) and "A New ATM Switch Architecture Based on STS-type Shared Buffering and its LSI Implementation," by K. Oshima, et al., in *Proceedings of International Switching Symposium* 1992., Yokohama, Japan, October 1992, pp. 359–363, which are hereby incorporated by reference. These references describe a queue of cells for which a destination vector is provided. The queue is searched for the cell closest to the head of the queue which matches a selected destination.

In this invention, cells are copied from the secondary queue 74 to the primary queue 70 by the requeuing module 78. This requeuing module 78 accesses the virtual channel table to determine the virtual channel for which a cell from the secondary queue 74 should be selected. Generally speaking, the requeuing module 78 accesses a cell from the secondary queue 74 when the virtual channel becomes unblocked. For example, it may replace a transmitted cell from the primary queue with another cell from the secondary queue for a virtual channel of the same priority class as the virtual channel of the transmitted cell.

The secondary queue 74 is not an identical implementation of the priority queue of Kondoh et al. Rather, the destination bits described by Kondoh et al. are replaced by virtual channel information. The search performed by requeuing module 78 on secondary queue 74 is for the first cell of a given virtual channel.

FIG. 3 also shows a destination selection module 80 which indicates the destination to which a cell should be transmitted from the primary queue 70. This indicated destination is also used by requeuing module 78 to select the next virtual channel for which a cell is to be copied from the secondary queue to the primary queue.

This ATM switch can support broad class of admission control and scheduling algorithms for real-time communication, including weighted fair queuing, earliest deadline first, rate monotonic, virtual clock, and many others. It also can support credit-based flow control for individual virtual channels such as proposed in "The FCVC (Flow-Controlled Virtual Channels) Proposal for ATM Networks," Version 2.1, presented to the ATM Forum, May 1994 by H. T. Kung and A. Chapman, including static and adaptive buffer management. Rate-based flow control, round-robin scheduling within any priority level, and multiple classes of traffic, each with its own scheduling, buffering, and flow control policy are also possible.

Credit-based flow control is a process for avoiding cell loss in non-real-time communication traffic, especially where there is a lot of higher priority real-time traffic of widely varying bandwidths. Its objective is to deliver the entire unused bandwidth of each network link at any given moment to non-real-time traffic, but without causing cell loss due to congestion or buffer overflow in any switch. The principle underlying this process is simple: a node may not transmit cells until it knows that there are buffers available in the downstream node to receive those cells. This knowledge is transmitted in the form of credit information from the downstream node to the upstream node. The upstream node maintains a credit count for each separately schedulable virtual channel, for example in the virtual channel table. The upstream node uses the credit count to decide whether it can transmit safely cells of that virtual channel to the downstream node.

If the credit count is positive, the upstream node can transmit that many cells to the downstream node. If the credit count is zero, it must hold the cells of that virtual channel it its local buffer until it receives new credits from the downstream node. Thus the switch hold cells of a virtual channel (or VPC) in its buffers when credits are not available and release those cells from the buffers when credits become available. The ability to hold cells is enabled by the primary and secondary queues 70 and 74 and the VC table 76. In operation, an incoming cell is examined by the queuing decision module 72 to determine the virtual channel to which the cell corresponds. If the virtual channel is blocked, by virtue of a negative credit count, as determined by a lookup in the VC table 76, the cell is queued in the secondary queue. Otherwise it is queued in the primary queue. When the credit count becomes positive, the requeuing module 78 transfers the cells to the primary queue 70.

Figure 4:
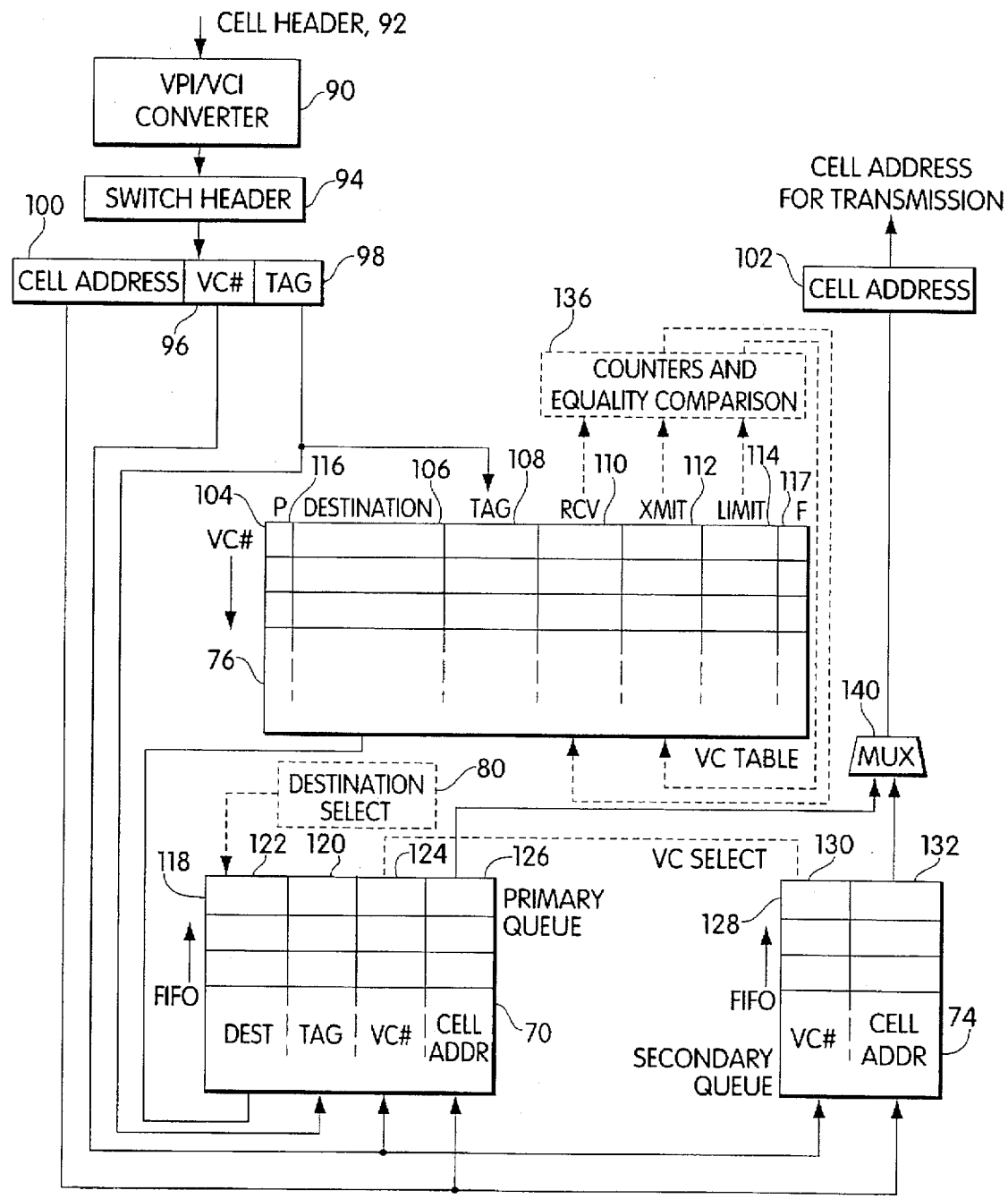
FIG. 4 is a more detailed block diagram of FIG. 3 with more details of the two queues.

The control section 22A, and the primary and secondary queues 70 and 74 and VC table 76 of the dual queue module 18A will now be described in more detail in connection with FIG. 4. Three fields are received by the control section 22A, namely the cell address 100 of the cell in buffer memory 20, the virtual channel identifier (VC) 96 and the tag 98 representing the 'priority' or other scheduling parameter. The cell address is assigned when the cell is received and stored in the memory 20. The VC is calculated by a VPI/VCI converter 90 and is prepended to the cell as part of the switch header. The tag 98 of the cell is calculated either by table lookup or by a real-time scheduling algorithm as described in U.S. Pat. No. 5,455,825. The final output of this control section with dual queues schedules the cells for transmission by providing a sequence of cell buffer addresses 102, one for each physical output link during each cell transmission cycle.

The VC Table 76 has an entry 104 for each virtual channel and, where the controller 22A is embodied in an integrated circuit, serves as an on-chip database. Access to the VC table is preferably pipelined. The fields in a VC Table 76 include a destination vector 106, containing one bit for each output link to which cells on this channel must be transmitted. The destination vector is defined when the virtual channel is created. A multicast channel is one in which more than one bit of the destination vector is set. A tag field 108 contains the current priority for the virtual channel. This priority is updated from the tag field 98 of each cell received for the virtual channel and is used to set the tag field 120 of entries 122 in the primary queue 70 which are loaded from the secondary queue 74.

A numerical field "rcv" 110 represents the serial number of the most recently received cell for this virtual channel. This field is initialized to zero when the virtual channel is first created and incremented each time a cell is received. A numerical field "xmit" 112 represents the serial number of the most recently transmitted cell on this virtual channel. This field is initialized to zero when the virtual channel is first created and is incremented each time a cell is transmitted and removed from the primary queue 70. In the case of a multicast virtual channel, the field 112 is only incremented when the cell has been transmitted to all branches. A numerical field "limit" represents the highest cell serial number authorized for transmission by the flow control algorithm. This field is updated, for example, when credit cells are received from a downstream node, as will be described in more detail below in connection with the discussion of credit-based flow control. The three numerical fields 110, 112 and 114 of the VC Table 76 may be fixed-width binary values which wrap, provided that they have as many bits as are in cell addresses. Thus, when any counter wraps around, there is no danger that its value would be confused with a value different by n, where n is the total number of cells in the system. Therefore, all comparison may be done strictly for equality.

A "P-flag" 116 is a single bit field used to indicate whether the secondary queue is used for the virtual channel corresponding to the entry or not. A limitation is that virtual channels with a set P-flag may not be flow-controlled and do not participate in round robin scheduling. Dynamic priority is possible only on channels where the P-flag is set. When set, e.g., having a value of one, every cell of this virtual channel must be enqueued directly in the primary queue 70 immediately when it is received. This field is therefore examined by the queuing decision module 72. When not set, e.g., having a value of zero, at most one cell of this virtual channel may be queued in the primary queue at any given time. In normal operation, multi-cast channels should have a set P-flag. This means that each cell of a multi-cast channel is enqueued separately in the primary queue and hence can be transmitted independently on each of its branches. If a multicast channel were to have an unset P-flag, then no cell could be transmitted to any branch before the previous cell were transmitted to all branches.

An "F-flag" 117 is a single bit field used to indicate whether the virtual channel is subject to flow control, such as a credit-based flow control. When set, e.g. having a value of one, the corresponding virtual channel is not subject to flow control and thus the limit field is not used. A value of zero means that the virtual channel becomes blocked whenever the "xmit" value 112 becomes equal to the "limit" value 114 and remains blocked until limit is updated.

The primary queue 70 is a tag-based searchable FIFO of the kind described in U.S. Pat. No. 5,455,825. Each entry 118 in the primary queue 70 represents a cell that is immediately eligible to be transmitted. For an individual virtual channel, zero, one, or all of its currently buffered cells are represented by entries in the primary queue, depending upon the value of the "P-flag" field 116 and the availability of credits.

Entries 118 in the primary queue 70 have four fields. A destination vector 122 is initialized from the destination field of the VC Table 76, but its bits are reset when transmission to the corresponding links is completed. A numerical tag 120 represents the priority of the cell represented by the entry 118. The VC field 124 stores the VC of the virtual channel corresponding to this entry. The cell address field 126 represents either the cell address of the individual cell of this entry, or, if it is a null value, that the cell address is to be obtained from the secondary queue 74.

If the P-flag field 116 of a VC Table entry 104 is one, then all of the buffered cells for that virtual channel are automatically eligible for transmission at the priorities determined by their tags, and all are represented by individual entries in the primary queue 70. This would be the case for, say, a real-time channel, a multi-cast channel, or some other virtual channel not subject to flow control. If, however, the P-flag field is zero, then the virtual channel is subject to flow control, round robin scheduling, or both. The primary queue 70 will then contain at most one entry, representing the first cell in the buffer for that virtual channel. A new entry is added to the primary queue 70 only after a previous one is removed and transmitted. A virtual channel that is blocked due to flow control has no entry in the primary queue.

The secondary queue 74 contains one entry 128 for each cell in the buffer which is not explicitly contained in the primary queue 70. Each entry 128 in the secondary queue has two fields: the VC 130 and its cell address 132. The secondary queue 74 is a searchable FIFO similar to that described by Kondoh et al., except that searching is done by exact match of VC rather than by a destination vector as described above.

In this system, every cell in the buffer memory 20 is represented either by an entry in the primary queue 70 with a non-null cell address or by an entry in the secondary queue 74. Moreover, if a cell is represented by an entry in the secondary queue 74, then its VC may or may not be represented by an entry in the primary queue 70, depending upon whether that virtual channel is eligible for transmission.

The secondary queue will now be described in more detail in connection with FIGS. 5–6. The secondary queue is implemented using a self-timed VLSI FIFO circuit 31. Such a queue is described in Kondoh et al. Queue entries are inserted into the tail of the FIFO 31 and automatically shift forward toward the head of the queue to occupy unused entries of the FIFO. Each queue entry is in a register 39 and contains a virtual channel number (VC#) field 41 and an address field 35. Each VC# field 41 contains a binary number representing the virtual channel. Also shown in FIG. 5 are a search circuit 50 and a bus read circuit 45.

Figure 5:
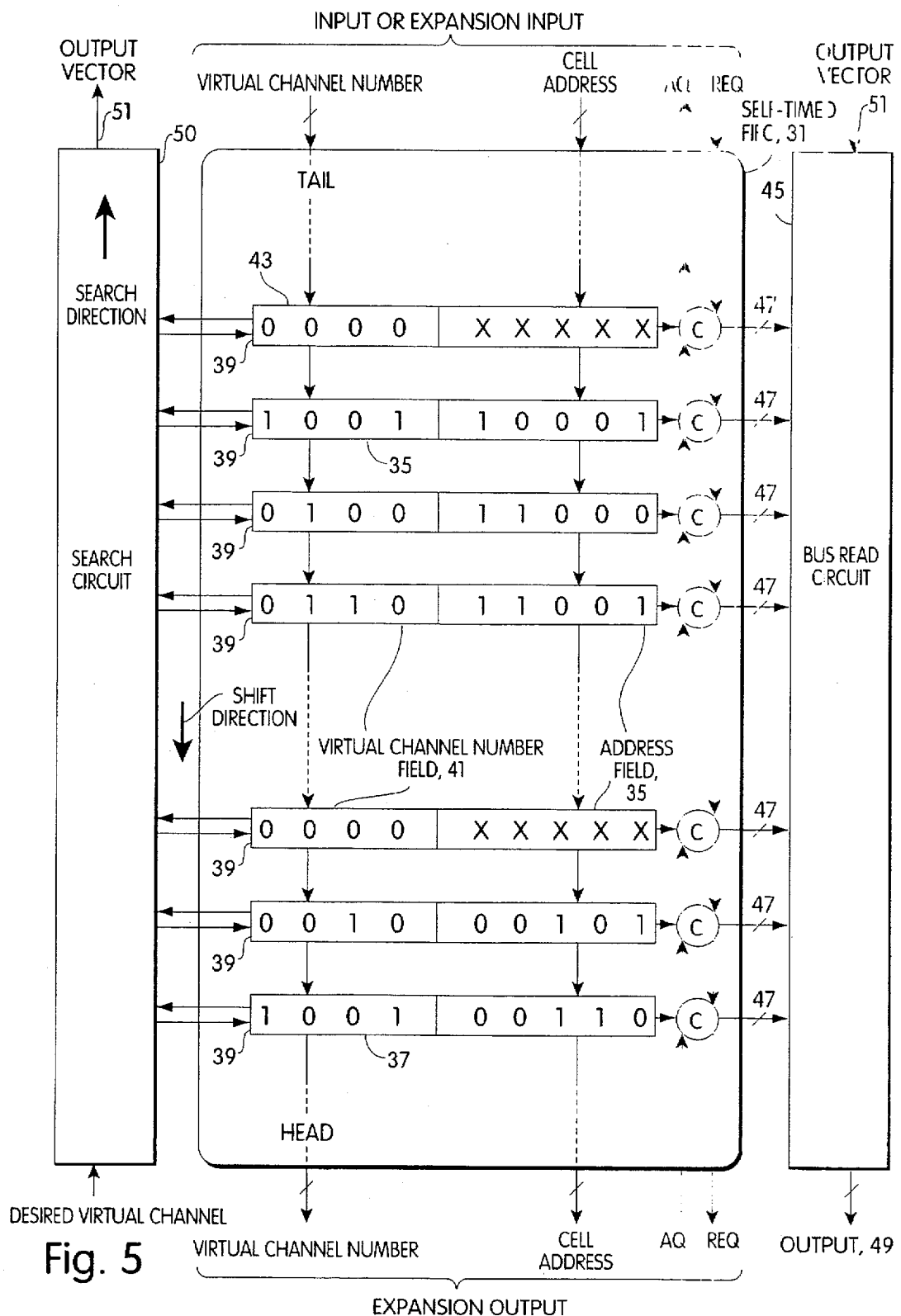
FIG. 5 is a block diagram of the secondary queue, registers in a FIFO for representing each cell in the queue, a search circuit for selecting cells from the queue which match a particular virtual channel, and a bus read circuit for reading out information from the queue.
Figure 6:
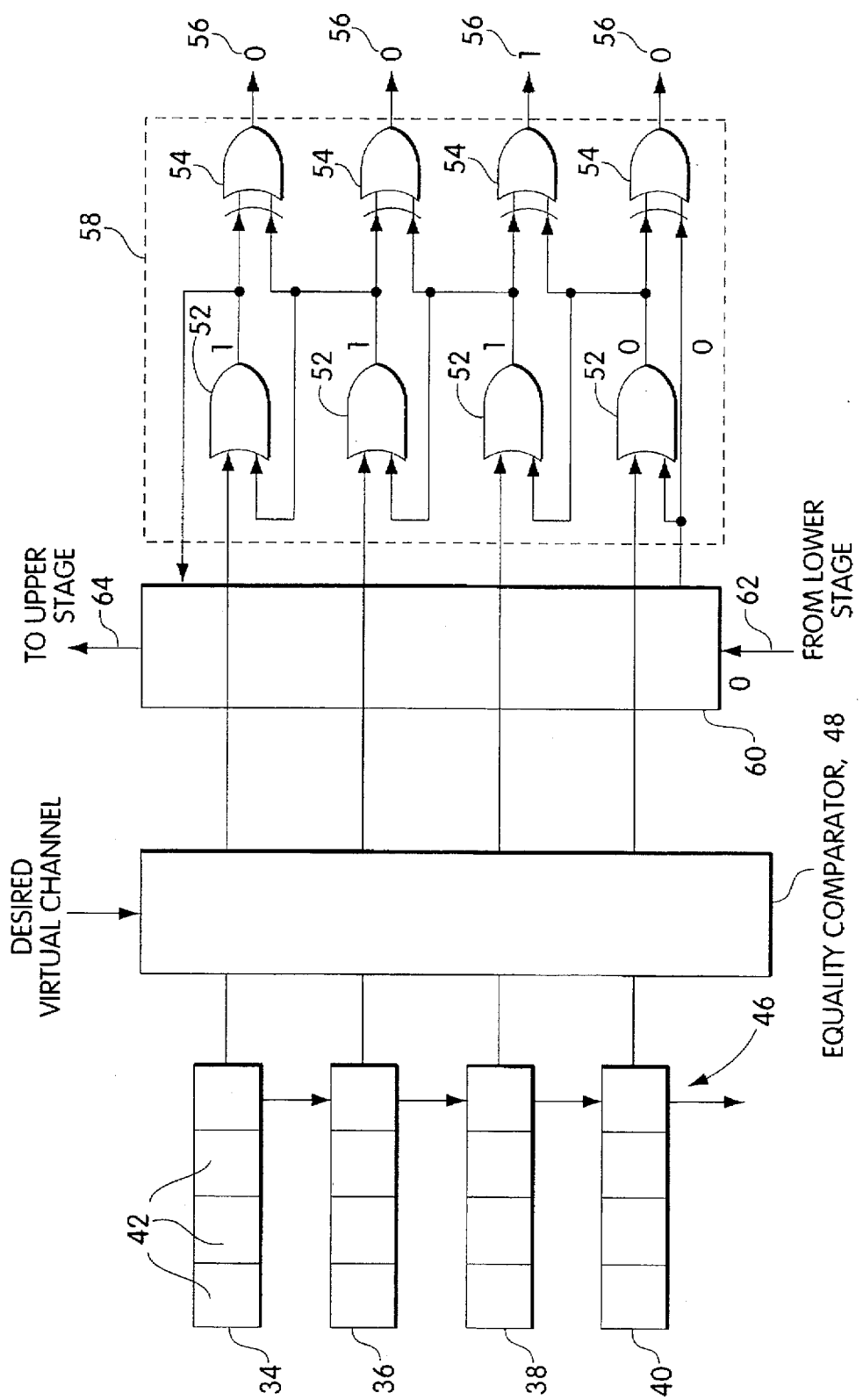
FIG. 6 is a schematic diagram of four queue entries input to the search circuit in FIG. 5.

In the example of FIG. 5, there are two cells destined to the same virtual channel as indicated at 35 and 37. A scheduling algorithm establishes the order of transfer of these cells to the primary queue. In the preferred embodiment, the first cell of a given VC# is transferred. Thus, whenever a number in VC# field 41 of a particular entry 39 has the same value as the desired virtual channel, the cell in buffer memory 20 at the address identified in the address field 35 of that entry is transferred to the primary queue.

In operation, when control module 22 commands queue and search module 18 to search for a cell to transfer to the primary queue, it does so by specifying the desired virtual channel to the search circuit 50. Search circuit 50 then selects the queue entry 39 which is nearest to the head of the queue and which has a virtual channel number corresponding to the desired virtual channel. It outputs a vector 51 indicating which entry is the selected entry, for example, by outputting by a binary value with a "1" indicating the selected entry in the queue. A bus read circuit 45 receives the output vector 51, then accesses the selected entry to obtain the cell address field 35 of the selected entry. The bus read circuit 45, provides this cell address at its output 49. The selected entry is then removed from the queue by setting the VC# field to a non-VC value, e.g.–1.

The search circuit 50 will now be described in more detail in connection with FIG. 6. This figure illustrates four queue entries 34, 36 and 40, each having a VC#42 field. The equality comparator 48 receives the virtual channel numbers of the queue entries and does an equality comparison with the desired virtual channel. This comparison may be performed in a bit parallel manner by an exclusive-or of each queue entry with the desired virtual channel. The outputs of the exclusive-or may be NOR'ed together to obtain an output for each queue entry. Alternatively, a bit parallel exclusive-nor may be performed of each queue entry with the desired virtual channel, and the output of the exclusive-nor may be AND'ed together to provide the output for each queue entry. The equality comparator 48 produces a set of zero and one values, with zero values indicating that the corresponding cell does not qualify for selection; and one values indicating that the corresponding cell does qualify for selection.

The output of equality comparator 48 is a set of bits applied to a comparison circuit 58 which compares the bit of each entry with those of its immediate neighbors. This is accomplished by the OR gates 52 and the exclusive OR gates 54 as illustrated. The result is that at most one of the output bits 56 has the value one, indicating that the corresponding entry has been selected for transmission.

As can be seen, an accelerator 60 may be utilized to speed up the search, so that all output links can be selected in turn within one cell cycle. Accelerator 60 is a conventional look-ahead circuit having an input 62 from a lower stage with its output 64 coupled to an upper stage.

Operation of this system will now be described. For each arriving cell, the controller 22A receives the cell buffer address and a switch header containing the VC and the priority tag. When the cell arrives, the VC Table 76 is indexed by the VC and the corresponding entry 104 is fetched. If no destination bits are set in this entry, the cell is immediately discarded and its cell address is recycled into a free cell pool used for the buffer memory. No destination bits are set when the cell is destined to a physical link of another switch module. Otherwise, what happens next depends upon the values of other fields of the VC Table. The "rcv" field 110 is incremented and the new tag value 98 is copied into the VC Table 76 into field 108. If the "P-flag" field is set, an entry 118 consisting of the destination vector, the tag, the VC, and the cell address is added to the primary queue. No entry is added to the secondary queue. If the "P-flag" is not set, an entry 128 consisting of the cell buffer address and VC is instead added to the tail of the secondary queue 74.

In addition, when the "P-flag" field is not set, the "xmit" field 112 of the VC Table is compared with both the old value of the "rcv" field 110 and the "limit" field 114. If "xmit" is equal to the old "rcv" and either the "F-flag" (field 117)=1 or "xmit" is not equal to "limit", then an entry 118 is added to the primary queue consisting of the destination vector, the tag, the VC, and a null cell address. Using this rule, each arriving cell is enqueued either in the primary queue or the secondary queue. If the cell is added to the secondary queue, an entry is also added to the primary queue if and only if there is no entry for that virtual channel already in the primary queue. This condition occurs when the "rcv" counter and "xmit" counters are equal and the virtual channel is not blocked due to flow control: i.e., its "xmit" counter is not equal to its "limit" value, or the channel is not flow controlled at all.

Output scheduling is driven by a sequencer (not shown), which steps through each physical destination once during each cell cycle. For each destination, the following steps are performed. First, the primary queue is searched for an entry 118 with a matching destination bit and the smallest tag. If none is found, an idle cell is returned for transmission. Otherwise, if an entry 118 is selected, the VC is retrieved from the entry and the destination bit of the selected entry is reset. The cell address field of the selected entry 118 is then examined. If the cell address is not null, that cell address is directed to the output line which accesses the memory 20 to transmit the cell. Otherwise, when the cell address is null, the cell address 132 of the first entry 128 in the secondary queue 74 for the corresponding VC is output for transmission by the output line. A null value in the cell address thus switches minx 140 to output the cell address 102 from the secondary queue 74.

After transmission of the cell, and if the entire destination vector is now zero, the "xmit" counter is incremented. In addition, if the cell address from the entry of the primary queue was null, the selected entry of the secondary queue is removed. Finally, the new value of the "xmit" field of the VC Table is compared with both the value of the "rcv" field and the "limit" field by comparator 136. If the new "xmit" value is not equal to the "rcv" value and either the "F-flag" is set to 1 or the "xmit" value equals the "limit" value, then a new entry is added to the primary queue consisting of the destination vector and tag from the VC Table, plus the VC and a null cell address. Thus, an entry for the VC is added back into the primary queue only if there are more cells to transmit on that virtual channel, i.e., the "xmit" counter has not caught up with the "rcv" counter, and if the channel is not blocked due to flow control, i.e., the "xmit" counter has not caught up with the "limit" value.

When the destination vector of any primary queue entry becomes zero, the self-timed circuitry of the FIFO in the primary queue will squeeze out that entry and fill it in with an entry from behind it in the queue. Subsequent entries in the queue will also move forward to fill in vacant slots. The same is true of the secondary queue when entries are deleted.

In this embodiment, two operations are provided to manage flow control. When a credit update cell containing new credits is received from a downstream node, a new "limit" value is calculated and inserted into the VC Table. Additionally, the "xmit" field of the VC Table 76 is compared with both the value of the "rcv" field and the old value of the "limit" field. If the "xmit" value is not equal to the "rcv" value and either the "F-flag" is set=1 or the "xmit" value is equal to the old "limit" value, then a new entry is added to the primary queue consisting of the destination vector and tag from the VC Table, plus the VC and a null cell address. This operation takes one cell cycle and therefore should be performed using a special format of switch header which contain the new "limit" value and has special processing. When such a cell is received, the "limit" value is updated and the cell buffer address is immediately returned to the idle cell pool. This operation can be performed by using the queuing decision module.

Credit-based flow control also uses a credit check cell received from an upstream node which contains a new value of the cell serial number to allow the switch to resynchronize is own serial numbers with those of the upstream node. This is the means of recovery of the state of flow control from the case of lost data cells. If the controller 22A discovers that its own value of the "rcv" counter is less than the serial number contained in the credit check cell, it increments the "rcv" counter by the difference. It also causes both the "rcv" and "xmit" to be incremented by these same difference, but not more than the value of the "limit". The credit check may be implemented by a cell with a special format of switch header, similar to the credit update cell.

The maximum credit balance for a flow-controlled virtual channel may be some large value, but the credit balance known to the switch is the difference between the "limit" and "xmit" values, modulo n. The higher level control of the switch is responsible for administering larger values and for delivering them in small units to the controller.

One potential problem may arise when using a scheduling algorithms such as Earliest Deadline First and Virtual Clock. In these scheduling algorithms, tag values increase monotonically for each virtual channel. Eventually, they will overflow the size of the tag field. One way to cope with this overflow is to add a control state to the primary queue to allow large tag values (with high order bits set to one) to appear to be smaller than very small tag values (with high order bits of zero). The control state would be applied when tags start to overflow the high order bit, and would be reset when all tags with high order bits of one have been finally been processed.

One benefit of this architecture is that credit-based flow control, real-time transmission and round robin scheduling of all virtual channels with the same priority is made possible. Round robin scheduling is possible by unsetting the P-flag, e.g. to the value 0, for all virtual channels of the same priority. Each time a virtual channel is selected from the primary queue, its first cell is transmitted, then an entry for the next cell is placed at the end of the queue. Since the primary queue is sorted by tag, it will eventually reach its appropriate priority level but remain behind the other virtual channels with the same tag value. By definition, cells from virtual channels with the same priority can be transmitted in any order, so long as ordering is preserved within a virtual channel. In cases where FIFO ordering is preferred, this can be ensured by setting the P-flag to 1.

In this design, flow control of a multi-cast channel may be difficult. Such flow-control of a multicast channel could be provided by controlling each branch independently. For practical proposes, this would make each branch a separate virtual channel with its own "rcv", "xmit", and "limit" values. Also, the switch would be the source node for these new virtual channels. It may be difficult, however, to update all of the "rcv" values at once.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A switch for use in an asynchronous transfer mode network, comprising:

a primary queue for storing cells before transmission to an output line, wherein a cell is selected for transmission according to a tag-based priority search;

a secondary queue for storing cells of blocked channels wherein a cell is selected for transfer to the primary queue when its channel is unblocked; and a queuing decision module for receiving cells from the input lines and for directing the cells to one of the primary queue and the secondary queue according to whether the channel of the cell is blocked.

2. The switch of claim 1, further comprising:

a requeuing decision module having an input for receiving an indication of a channel of a cell transmitted from the primary queue and controlling the secondary queue to transfer a cell of an unblocked channel of the same priority class of the transmitted cell to the primary queue.

* * * * *